(12) United States Patent
Blake

(10) Patent No.: US 10,667,619 B1
(45) Date of Patent: Jun. 2, 2020

(54) ADJUSTABLE FOOT SUPPORT STAND

(71) Applicant: Lu-Anne Blake, Port Richey, FL (US)

(72) Inventor: Lu-Anne Blake, Port Richey, FL (US)

(*) Notice: Subject to any disclaimer, the term of this patent is extended or adjusted under 35 U.S.C. 154(b) by 0 days.

(21) Appl. No.: 15/956,821

(22) Filed: Apr. 19, 2018

(51) Int. Cl.
*A47C 16/02* (2006.01)
*A47C 7/00* (2006.01)
*F16B 7/14* (2006.01)

(52) U.S. Cl.
CPC ............ *A47C 16/025* (2013.01); *A47C 7/004* (2013.01); *F16B 7/14* (2013.01)

(58) Field of Classification Search
CPC .......... A47C 16/025; A47C 7/004; F16B 7/14
See application file for complete search history.

(56) References Cited

U.S. PATENT DOCUMENTS

| | | | | |
|---|---|---|---|---|
| 4,261,348 A * | 4/1981 | Hargadon | ............. | A61F 15/005 602/39 X |
| 5,908,397 A * | 6/1999 | Tatum | .................... | A61F 5/3761 128/845 X |
| 6,764,055 B1 * | 7/2004 | Lee | ........................ | A47B 23/00 248/125.1 X |
| 7,631,604 B2 | 12/2009 | Huang | | |
| 2006/0175523 A1 * | 8/2006 | Tai | ........................ | A47B 19/002 248/460 X |

* cited by examiner

*Primary Examiner* — Anthony D Barfield
(74) *Attorney, Agent, or Firm* — Sanchelima & Associates P.A.; Christian Sanchelima; Jesus Sanchelima

(57) ABSTRACT

The present invention provides an elevated foot support stand comprising a telescopic leg supported on ground by three leg supports and providing a platform fixed to the telescopic leg at top end thereof. The telescopic leg allows for adjusting the height of the platform above the ground. The leg supports are foldable for convenient storage of the foot support stand assembly. Further, the platform can be articulated with respect to the telescopic leg for adjusting angle thereof, and for folding during storage. The foot support stand can be used to support the foot while performing a pedicure, shaving one's legs or applying medication to the foot among other things.

13 Claims, 2 Drawing Sheets

ADJUSTABLE FOOT SUPPORT STAND

BACKGROUND OF THE INVENTION

1. Field of the Invention

The present disclosure generally relates to a foot support stand, and more particularly to an adjustable foot support stand to provide variable elevations for supporting feet of a person above the ground.

2. Description of the Related Art

Pedicures are a common grooming activity, particularly among women. During a pedicure, whether self-administered by the user or applied by an attendant in a parlor or the like, the foot is typically positioned on a surface for the user or the attendant to trim and file the toenails and to apply coatings and polishes to the toenail surfaces. When having a pedicure done, it is desirable to position one's foot on a stable support at an elevation above the ground. Typically, the parlors utilize a stool or the like, which is placed in front of the customer to whom the pedicure is to be performed, for the customer to place his/her feet on the said stool to get some elevation. Such arrangement may get the work done, but such stools are fixed structures which do not allow for varying the provided elevation to accommodate for customers of varying heights, and/or vary the height at which the different customers feel comfortable to place their feet. Furthermore, such stool may take up additional space inside the parlor for storage thereof when not in use, which is not desirable, U.S. Granted Pat. No. 7,631,604 B2 (hereinafter referred to as '604 patent) discloses a telescopic and foldable table comprising a table frame having two supporting posts at two sides thereof; each post having a liftable inner tube; each post being installed to a transversal leg at a bottom end thereof; an upper end of the inner tube of the post having a pivotal unit which is pivotally installed to the table plane so that the table plane can pivotally move or transversally displace. By above mentioned components, the table is telescopic and foldable. Each post has a plurality of openings for determining the elevation of the post; each inner tube has a telescopic buckle and a control rod for controlling the telescopic movement of the buckle; and the control rod is controlled by a control unit protruding out of the inner tube. The pivotal unit is pivotally installed to a pivotal seat at a bottom surface of the table plane.

Such table of the '604 patent may be suitable for the disclosed purpose of being utilized in classrooms for adjusting elevation thereof for kids of different heights. However, the design of the disclosed table of the '604 patent may not be suitable for use in a parlor setting or for home use by a user for performing pedicure or similar operations. Accordingly, there is a need to develop a foot support stand to provide a steady platform that makes a person's foot readily accessible for a pedicure or the like, and which can be adapted to provide different elevation for persons of varying heights.

SUMMARY OF THE INVENTION

It is one of the main objectives of the present invention to provide a foot support stand having a height-adjustable footrest platform which allow a person to comfortably place his/her feet thereon at an elevation above the ground.

It is another objective of the present invention to provide a foot support stand in which the footrest is padded for comfortable receipt of a foot.

It is yet another objective of the present invention to provide a foot support stand which is foldable for easy storage thereof.

It is still another objective of the present invention to provide a foot support stand which is less weighty and is aesthetically pleasing.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Illustrative embodiments of the present invention are described below. The following explanation provides specific details for a thorough understanding of and enabling description for these embodiments. One skilled in the art will understand that the invention may be practiced without such details. In some instances, well-known structures, processes and functions have not been shown or described in detail to avoid unnecessarily obscuring the description of the embodiments.

It shall be noted that unless the context clearly requires otherwise, throughout the description, the words "comprise," "comprising," "include," "including," and the like are to be construed in an inclusive sense as opposed to an exclusive or exhaustive sense; that is to say, in the sense of "including, but not limited to." Words using the singular or plural number also include the plural or singular number, respectively while adhering to the concepts of the present invention. Furthermore, references to "one embodiment" and "an embodiment" are not intended to be interpreted as excluding the existence of additional embodiments that also incorporate the recited features.

Figure 1:
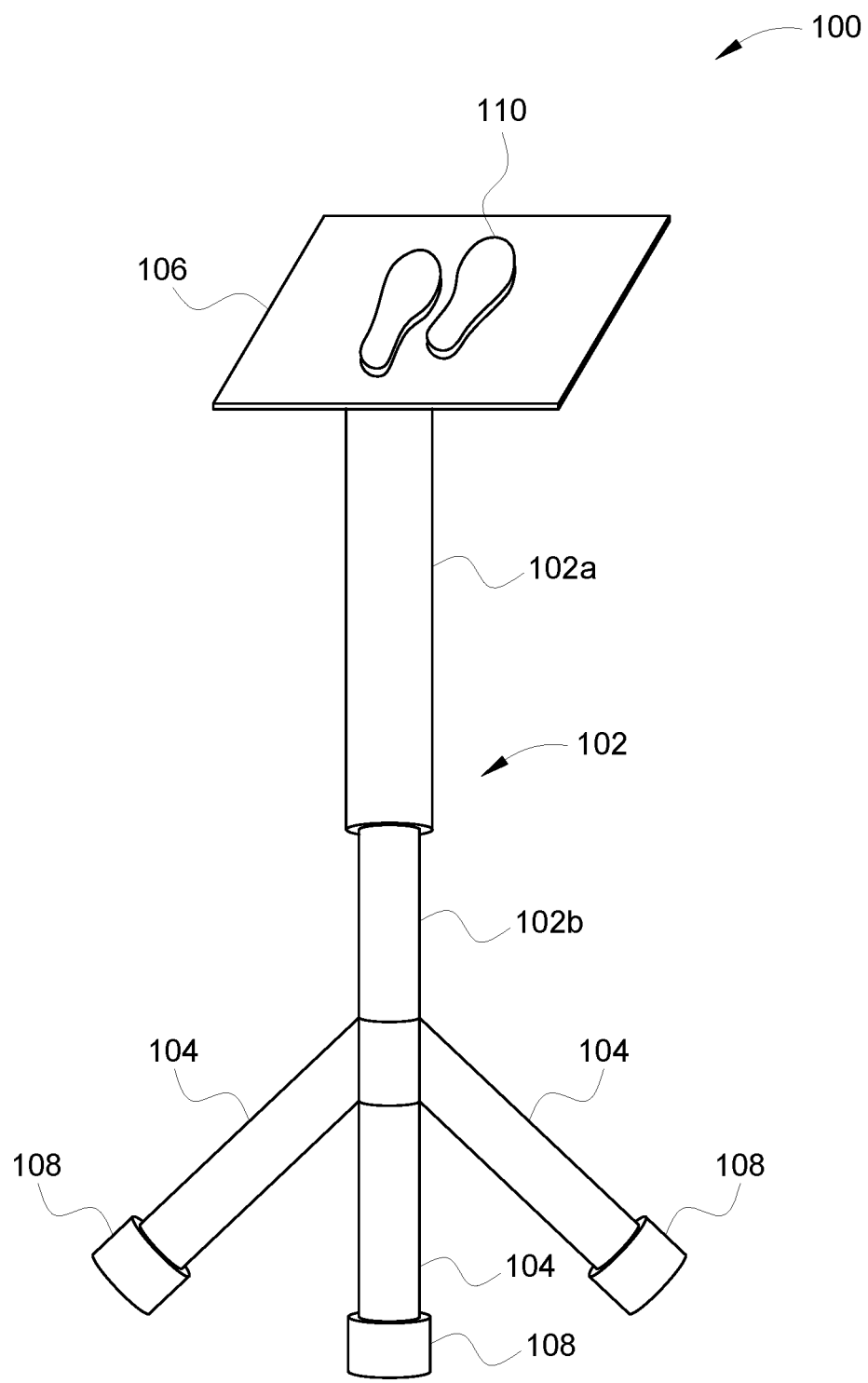
FIG. 1 illustrates a diagrammatic view of a foot support stand in an unfolded configuration, in accordance with one or more embodiments of the present disclosure.

FIG. 1 illustrates a diagrammatic view of a foot support stand (referred by the numeral 100), in accordance with one or more embodiments of the present disclosure. As may be seen, the foot support stand 100 is generally in the form of a stool adapted to provide a seat in a conventional manner, and which may provide means for supporting the users' feet in a raised position for facilitating performing pedicure procedure or the like. Although the foot support stand 100 is described herein as being a pedicure station, it may be contemplated that the foot support stand 100 can be used in other fields and applications that can utilize a foot rest. For example, the foot support stand 100 can be useful to podiatrists and other medical practitioners, as well as footwear retailers. Further, the foot support stand 100 can be utilized by the user for cleaning or polishing the shoe by lifting and placing the foot with the shoe worn thereon on to the foot support stand 100, and similarly for various other applications as will be discussed in the subsequent paragraphs.

As illustrated in FIG. 1, the foot support stand 100, primarily, includes a telescopic leg 102, three leg supports 104 and a platform 106. Although the foot support stand 100 has been shown and explained in terms of the three leg supports 104, it may be contemplated that the foot support stand 100 may include more or less number of leg supports without any limitations. The telescopic leg 102 may be a vertically extending member to support the various components of the foot support stand 100 therein. The three leg supports 104 may be connected proximal to a lower end of the telescopic leg 102, and may be angularly extending therefrom to balance and support the telescopic leg 102 on the ground. Further, the platform 106 may be connected at an upper end of the telescopic leg 102, and may generally be horizontally disposed parallel to the ground in unfolded configuration of the foot support stand 100 (as illustrated in FIG. 1) in order to provide a seat for a user to place his/her feet thereon.

In an embodiment, the telescopic leg 102 includes an upper part 102a and a lower part 102b. The upper part 102a may be movable with respect to the lower part 102b in order to receive the lower part 102b inside thereof, thus providing the telescopic effect. In this manner, the height of the telescopic leg 102 and thereby the height of the foot support stand 100 can be adjusted as desired. As may be understood the upper part 102a may have an inner diameter slightly larger than an outer diameter of the lower part 102b, in order for the upper part 102a to receive the lower part 102b in the telescopic leg 102. FIG. 1 illustrates an unfolded configuration of the foot support stand 100 with the telescopic leg 102 disposed in extended position therein, and FIG. 2 illustrates a folded configuration of the foot support stand 100 with the telescopic leg 102 disposed in retracted position therein.

In one or more examples, the telescopic leg 102 may include a locking mechanism (not shown) that allows for the height of the telescopic leg 102 to be selectively adjusted to a user's desire. For example, such locking mechanism may include a locking protrusion provided with the upper part 102a for selectively engaging with apertures in the lower part 102b of the telescopic leg 102. The locking protrusion may be coupled to a coiled spring, such that the locking protrusion may be depressed by a user, which then allows the user to slide the lower part 102b in relation to the upper part 102a until another aperture is engaged, locking the telescopic leg 102 into position. It may be understood that the telescopic leg 102 may have multiple apertures allowing users of different heights to likewise adjust the foot support stand 100 to the desired height. In an exemplary configuration, the telescopic leg 102 may have three different height configuration from 12 inches to 18 inches above the ground. In other examples, the telescopic leg 102 may include hydraulic or pneumatic means as known in the art to maintain the adjusted height thereof even with the weight supported on the platform 106.

As noted earlier and shown in FIG. 1, the three leg supports 104 may be fixed at an angle with respect to the vertical telescopic leg 102, in the foot support stand 100. In one example, the three leg supports 104 may be foldable with respect to the vertical telescopic leg 102. For such purpose, the leg supports 104 may be connected to the telescopic leg 102 by means of articulation joints which are well known in the art and thus have not been described herein for the brevity of the present disclosure. For example, the leg supports 104 may be hingedly attached, so as to allow them to pivot or collapse with respect to the telescopic leg 102 (as illustrated in FIG. 2). When erect, the leg supports 104 may be locked into position using locking poles that extend from the leg supports 104 and that engage with accompanying apertures in the telescopic leg 102, may be spring loaded with locking pins, may use cotter pins, or any other equivalent leg locking means as those commonly associated with collapsible table legs.

Figure 2:
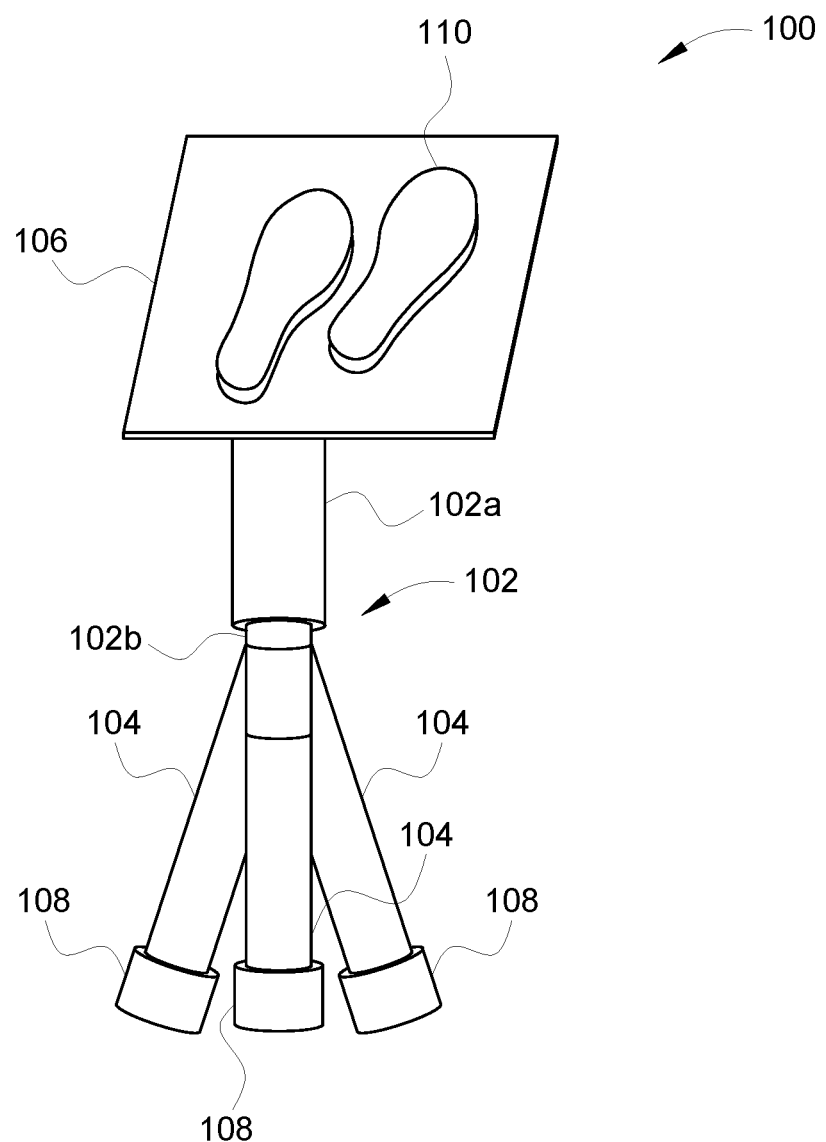
FIG. 2 illustrates a diagrammatic view of the foot support stand of FIG. 1 in folded configuration, in accordance with one or more embodiments of the present disclosure.

FIG. 1 illustrates an unfolded configuration of the foot support stand 100 with the three leg supports 104 disposed in extended position therein, and FIG. 2 illustrates a folded configuration of the foot support stand 100 with the three leg supports 104 disposed in folded position therein. In another embodiment (not shown), the leg supports 104 may also be removable from the telescopic leg 102 for easy storage, transportation, and cleaning purposes. Further, in one example, the three leg supports 104 may include rubber grips 108 provided with bottom ends thereof. These rubber grips 108 prevent skidding of the foot support stand 100 on the ground, thus providing safety during use thereof. In some alternate examples, the three leg supports 104 may include wheels (not shown) provided at bottom ends thereof, for easier movement of the foot support stand 100 depending on the application thereof.

Further, as illustrated, the platform 106 may be in the form of a rectangular base supported on the top end of the telescopic leg 102. In one example, the platform 106 may have a dimensions of about 1.0 inches by 5 inches for supporting the feet thereon. In other examples, the platform 106 may have some other suitable shape, such as, but not limited to, circular, square or trapezoidal without affecting the scope of the present disclosure. In one example, as illustrated, the platform 106 may include a footrest surface 110 which may be a non-slip surface formed thereon. The footrest surface 110 may be formed of rubber material or the like to provide enhanced comfort to the user when the user position his/her feet on the platform 106. In some examples, the platform 106 is provided with a pad of soft material, such as soft foam plastic, rubber, or the like, covered by leather, fabric, plastic sheet, or the like, fixed to at least an upper surface thereof.

In one embodiment, the platform 106 may be foldable with respect to the telescopic leg 102 in the foot support stand 100 of the present disclosure. For this purpose, the platform 106 may be connected to the telescopic leg 102 by means of articulation joint (similar to as used for the leg supports 104) which is well known in the art. Further, such articulation joint may allow for the platform 106 to be disposed at an angle in the foot support stand 100; for example, for supporting the user's feet placed thereon at an angle for performing a certain procedure which may require the same. The platform 106 may allow for both forward-tilting position as well as backward-tilting position. These settings may allow users to adjust the platform 106 for comfort as well as for either genetic or environmental factors, including, but not limited to, degenerative diseases, arthritis, surgeries, birth defects, and other such factors.

The adjustable foot support stand. 00 is only meant to hold a person's resting legs, and therefore may be made from lightweight, yet rigid materials. Generally, the adjustable foot support stand 100 is not meant to hold a person while standing, although it may with sufficiently strong and rigid materials. In one or more examples, the foot support stand 100, including the telescopic leg 102, the leg supports 104 and the platform 106, may be made from a variety of rigid materials, including woods, plastics, high-density polyethylene, carbon fibers, and metals. In a preferred example, the foot support stand 100, especially the telescopic leg 102 and the leg supports 104 therein, may be formed of aluminum material for strength and light-weight.

In operation, a user, such as a patient or a customer, sits in a chair on one side of the foot support stand 100 and the operator sits in a chair on the opposite side of the stand. First, the three leg supports 104 are unfolded to support the foot support stand 100 on the ground. Then, the height of the telescopic leg 102 is adjusted depending on the type of procedure to be performed. One foot or both feet of the user may be raised and rested on the platform 106 of the foot support stand 100, within easy reach of the operator. If needed, the height of the telescopic leg 102 may further be adjusted as per the liking and comfort of the user. Further, the angle of the platform 106 may be adjusted as per the procedure to be performed. It may be understood that the user may itself perform the said steps for performing a do-it-yourself procedure, such as a pedicure or the like. While the height of the telescopic leg 102 can be selected for various applications, a preferred embodiment for general pedicure procedures includes the foot support stand 100 in which the upper surface of the platform 106 is about 2.5 feet in height above floor level. There is thus provided the foot support stand 100 having an elevated footrest for comfortably receiving and supporting a foot, and which is easily reached by the pedicurist for performing pedicure procedure.

As noted earlier, the foot support stand 100 may have many other applications. The foot support stand 100 may also be utilized by home health care professionals providing diabetic monitoring, wound care, foot maintenance or post-surgical care. The foot support stand 100 provides more hygienic option to perform these tasks while ensuring both the patient's comfort as well as that of the operator. For individual users with health/pain issues, the user can put his/her foot on the foot support stand 100, adjust to his/her comfort level, for tying shoe laces, trimming foot nails or remove callouses with ease. The foot support stand 100 can also be used by users who prefer to shave their legs or use hair removal products outside of the shower. The foot support stand 100 may also be used for performing simple medical procedures, such as changing dressings, applying prescription creams or an antibiotic, etc. on the feet with ease. The foot support stand 100 of the present disclosure can generally find applications in nail salons, nursing homes, assisted living facilities, and at homes for people with need for performing any kind of procedure on feet and the like.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A foot support stand, comprising:
an elevated foot support stand including, a platform adapted to maintain a user's feet or foot in a raised position for facilitating a practitioner to work with the feet or foot, wherein said platform is rectangular and includes a thickness and a footrest surface, wherein said footrest surface is a rubber material mounted on a top surface of said platform, wherein said platform further includes perimeter sides having edges, wherein said perimeter sides are distal sides that extend freely and said edges are not connected to any other member, wherein said platform includes two depressions each in the shape of a foot configured to act as a guide to a user to know where to position their feet, wherein said two depressions are located on the center of said platform, wherein the location of said depressions are configured to provide a user with the most optimal and comfortable position for resting their feet, wherein said two depressions extend a predetermined amount within said thickness of said platform, wherein said two depressions include an outer perimeter in the shape of a user's foot, wherein said outer perimeter surrounds the entire edge of a user's foot, wherein said platform is configured to support a user's foot while preforming a pedicure, shaving ones legs, and applying medication; and
a vertical telescopic member adapted to adjust the height of said platform, said telescopic member includes a top and a bottom distal end, said platform mounted to the top distal end, three leg supports mounted two the bottom distal end of said telescopic member and adapted to securely balance said foot support stand on a surface, wherein said three leg supports are integrally mounted to said bottom distal end of said telescopic member, wherein said three legs supports are spaced apart an equidistant amount to form a tripod support base, wherein said three leg supports are disposed at least substantially vertically, wherein said three leg supports include a distal most end having rubber grips mounted thereon, wherein said rubber grips is a uniform cylindrical rubber component extending a predetermined mount along the length of said three leg supports, wherein the diameter of said rubber grips is larger than the diameter of said three leg supports.

2. The foot support stand of claim 1 wherein said telescopic member includes an upper portion and a lower portion, said upper portion having a diameter greater than said lower portion.

3. The foot support stand of claim 1 wherein said telescopic member includes a locking assembly to lock said platform at a predetermined height.

4. The foot support stand of claim 1 wherein said three leg supports are positioned at an angle with respect to said bottom distal end.

5. The foot support stand of claim 1 wherein said three leg supports are foldable.

6. The foot support stand of claim 1 wherein said three leg supports are mounted to said telescopic member using articulating joints.

7. The foot support stand of claim 1 wherein said three leg supports are mounted to said telescopic member using hinges.

8. The foot support stand of claim 1 wherein said three leg supports are removably mounted to said telescopic member.

9. The foot support stand of claim 1 wherein said three leg supports include a bottom distalmost end, a gripping member located on said bottom distalmost end.

10. The foot support stand of claim 9 wherein said three leg supports include wheels at said bottom distalmost end.

11. The foot support stand of claim 1 wherein said footrest surface includes a non-slip surface.

12. The foot support stand of claim 1 wherein said platform is mounted to said telescopic member using an articulation joint.

13. A foot support stand, comprising:
a platform adapted to maintain a user's feet or foot in a raised position for facilitating a practitioner to work with the feet or foot, wherein said platform is rectangular and includes a thickness and a footrest surface, wherein said footrest surface is a rubber material mounted on a top surface of said platform, wherein said platform includes two depressions each in the shape of a foot configured to act as a guide to a user to know where to position their feet, wherein said two depressions are located on the center of said platform, wherein the location of said depressions are configured to provide a user with the most optimal and comfortable position for resting their feet, wherein said two depressions extend a predetermined amount within said thickness of said platform, wherein said two depressions include an outer perimeter in the shape of a user's foot, wherein said outer perimeter surrounds the entire edge of a user's foot; and a vertical telescopic member adapted to adjust the height of said platform, said telescopic member includes a top and a bottom distal end, said platform mounted to the top distal end, wherein said telescopic member includes an upper portion and a lower portion, said upper portion having a diameter greater than said lower portion, wherein said upper portion extends from a lower part up to said platform, wherein said upper portion and said lower portion are cylindrical, three leg supports mounted two the bottom distal end of said telescopic member and adapted to securely balance said foot support stand on a surface, wherein said three leg supports are integrally mounted to said bottom distal end of said telescopic member, wherein said three legs supports are spaced apart an equidistant amount to form a tripod shape, wherein said three leg supports include a distal most end having rubber grips mounted thereon, wherein said rubber grips is a uniform cylindrical rubber component extending a predetermined mount along the length of said three leg supports.

* * * * *